United States Patent [19]

Roy

[11] Patent Number: 4,758,884
[45] Date of Patent: Jul. 19, 1988

[54] ELECTRONICALLY SWITCHED FIELD SEQUENTIAL COLOR VIDEO DISPLAY HAVING PARALLEL COLOR INPUTS

[75] Inventor: Edmond F. Roy, Fremont, Calif.

[73] Assignee: Kaiser Electronics, San Jose, Calif.

[21] Appl. No.: 865,215

[22] Filed: May 19, 1986

[51] Int. Cl.⁴ .................. H04N 9/22; H04N 9/12; H04N 9/16

[52] U.S. Cl. ........................... 358/66; 358/56; 358/64

[58] Field of Search ............... 358/42, 56, 58, 59, 358/60, 63, 64, 66

[56] References Cited

U.S. PATENT DOCUMENTS

| | | | |
|---|---|---|---|
| 2,825,754 | 3/1958 | Toulon | 358/58 |
| 3,006,989 | 10/1961 | Schröter | 358/60 |
| 3,754,228 | 8/1973 | Hwang et al. | 315/383 |
| 3,783,184 | 1/1974 | Ernstoff et al. | 358/66 |
| 3,821,796 | 6/1974 | Ernstoff et al. | 358/58 |
| 4,032,968 | 6/1977 | Miyoshi et al. | 358/60 |
| 4,090,219 | 5/1978 | Ernstoff et al. | 358/59 |
| 4,259,692 | 3/1981 | D'Amato | 358/60 |
| 4,305,092 | 12/1981 | Katzfey | 358/60 |
| 4,322,741 | 3/1982 | Kawabayashi | 358/64 |
| 4,438,453 | 3/1984 | Alston | 358/75 |
| 4,451,852 | 5/1984 | Masuda et al. | 358/56 |
| 4,460,850 | 7/1984 | Freyberger | 315/367 |
| 4,468,693 | 8/1984 | Fujita et al. | 358/75 |
| 4,490,739 | 12/1984 | Himuro et al. | 358/66 |
| 4,635,107 | 1/1987 | Turner | 358/64 |
| 4,695,772 | 9/1987 | Lau et al. | 315/370 |

FOREIGN PATENT DOCUMENTS

| | | | |
|---|---|---|---|
| 57-4662 | 1/1982 | Japan | 358/11 |
| 57-152285 | 9/1982 | Japan | 358/66 |
| 58-96480 | 6/1983 | Japan | 358/60 |
| 59-148483 | 8/1984 | Japan | 358/60 |
| 60-59888 | 4/1985 | Japan | 358/56 |
| 60-123163 | 7/1985 | Japan | 358/56 |
| 2139778 | 11/1984 | United Kingdom . | |

Primary Examiner—Edward L. Coles, Sr.
Assistant Examiner—Randall S. Svihla
Attorney, Agent, or Firm—Townsend and Townsend

[57] ABSTRACT

The invention uses a multiple beam cathode ray tube to write a television type raster, or frame, with the maximum data rate and writing speed reduced by a factor equal to the number of simultaneously operating beams. To overcome excessive slope in the picture, a stepped deflection is used such that the majority of vertical deflection occurs after a particular horizontal sweep is completed and before the successive sweep begins. The scanning speed is further increased by using an optical transmission filter capable of selectively transmitting separate colors emitted by the screen of the cathode ray tube wherein a portion of the filter may be set to transmit the next color in the color sequence while the remainder of the filter is transmitting the color presently displayed.

13 Claims, 3 Drawing Sheets

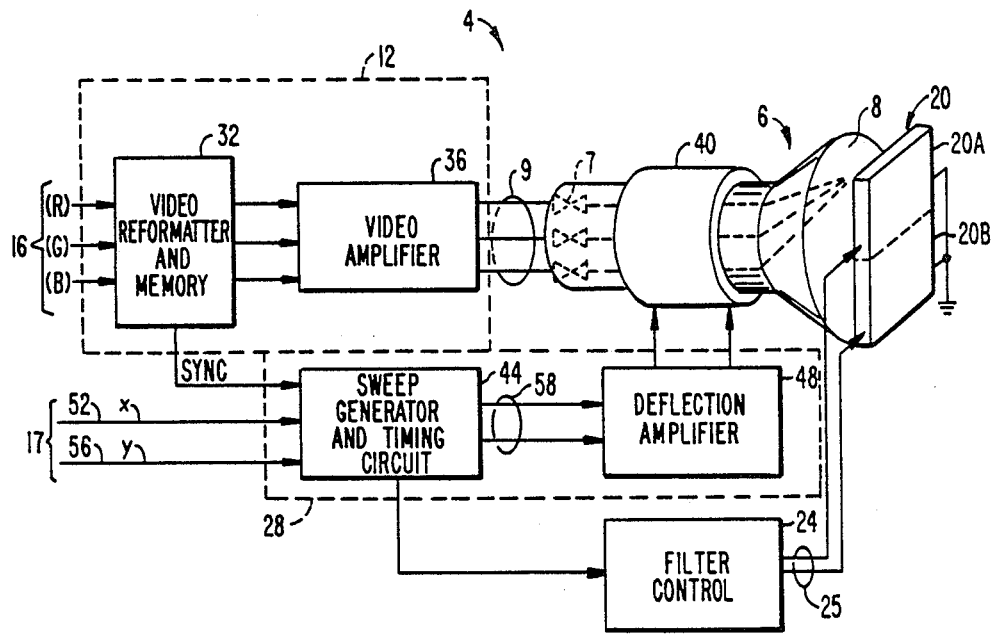
FIG._1.
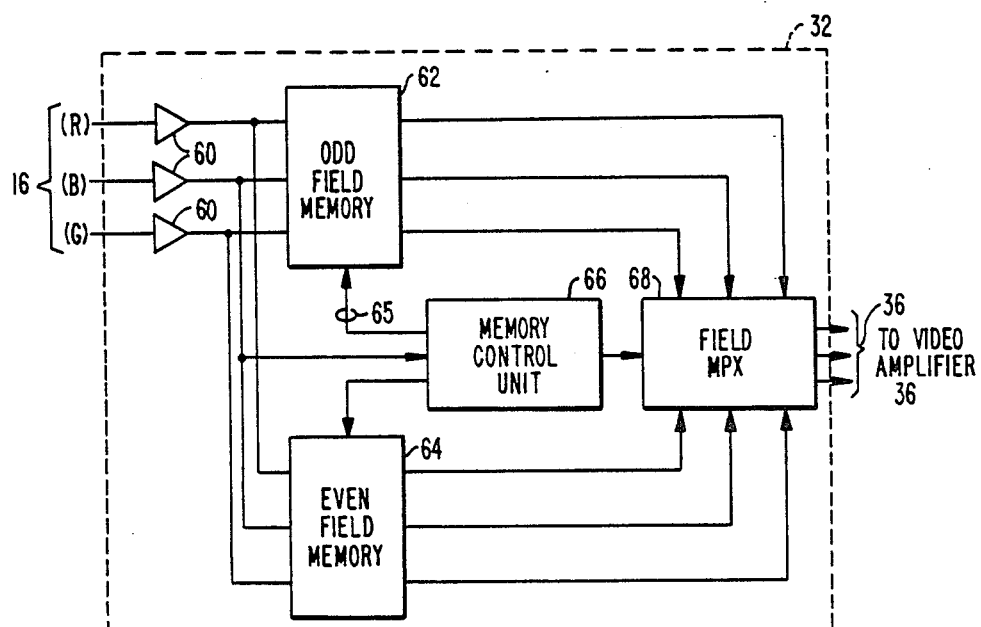
FIG._2.

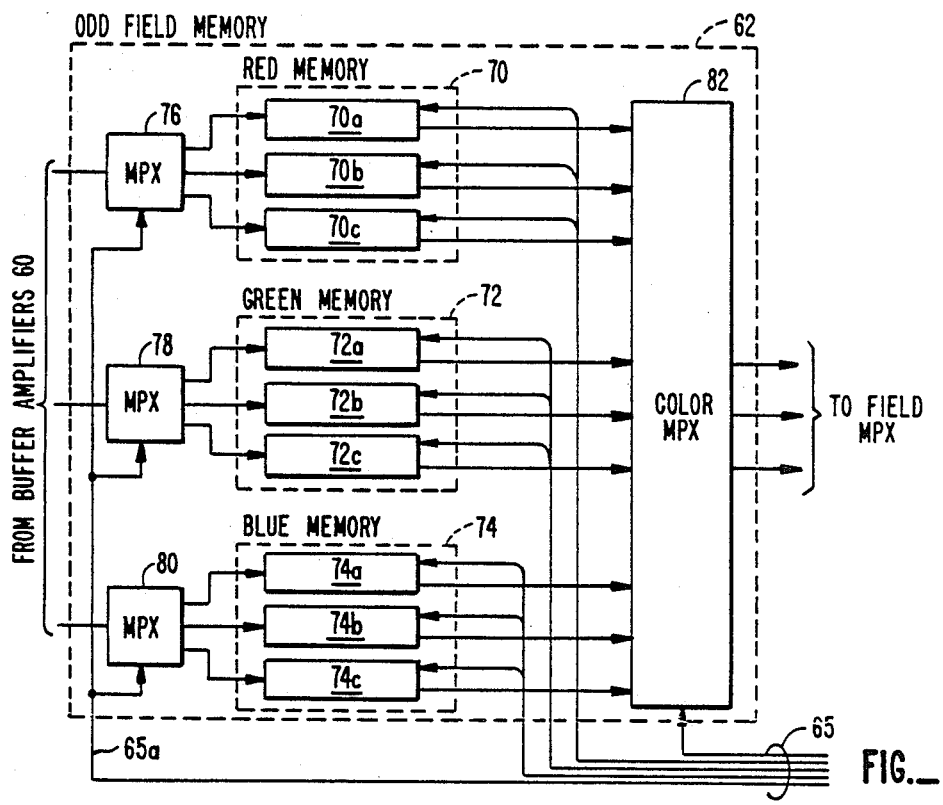
FIG._3.
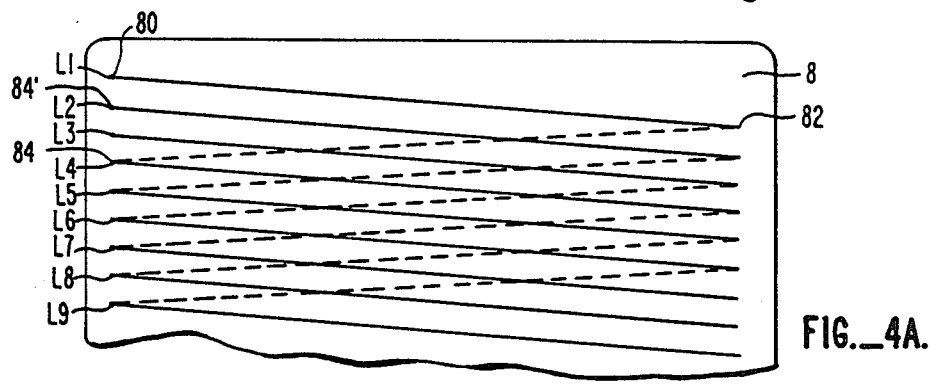
FIG._4A.
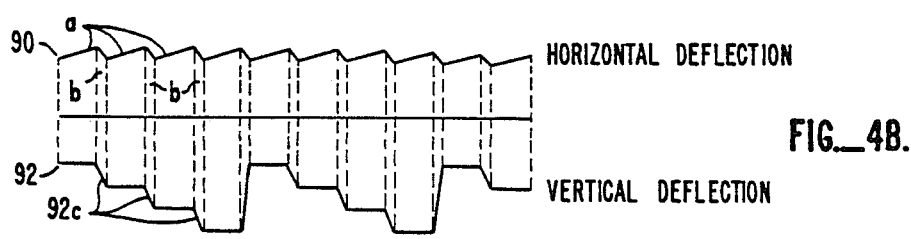
FIG._4B.

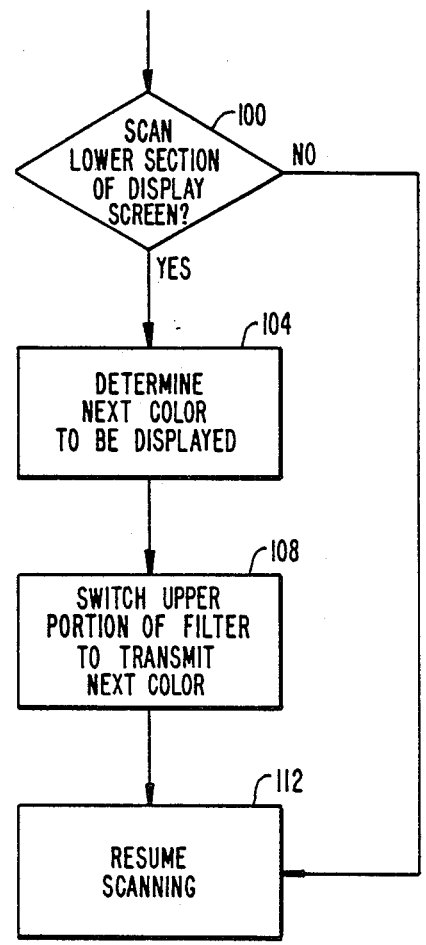
FIG._5.

ELECTRONICALLY SWITCHED FIELD SEQUENTIAL COLOR VIDEO DISPLAY HAVING PARALLEL COLOR INPUTS

BACKGROUND OF THE INVENTION

The invention relates generally to video display systems and, more particularly, to systems for the display of electronically-generated data or images and television video.

Electrically operated and controlled displays are used for a wide range of applications in forms requiring the display of color or monochromatic imagery received from broadcast or closed circuit television systems or from synthetic imagery and symbology sources such as computers or radar systems. For instance, to provide the crew in an aircraft cockpit with sensor, performance, and flight information, multipurpose displays are required which are capable of displaying imagery, symbology, and other data generated by radar, flight computer, navigation, and other aircraft systems on an individually selected basis, or in combination through video overlay techniques.

Another application of electrically operated displays is in color television. Under prior art, a cathode ray tube having a light-emitting screen is constructed and operated to produce three colors synchronized with an external source of color video. In one method, the tube is constructed using a system of three electron guns, each of which receives the color video signal corresponding to one of the colors to be produced. Colored dots on the screen are energized by an electron stream emitted from each electron gun to produce the color picture. This method results in a relatively low resolution, low brightness, and low color quality picture.

Field sequential color display systems are an attempt to overcome the above limitations. These systems operate on the basis that the color picture is broken up into three pictures transmitted sequentially and displayed in superimposed fashion. Each picture is made up of one of the three primary color components (red, green or blue). By overlaying the picture components at a sufficiently rapid rate, the images appear to the eye to fuse into a composite full-color image.

Such field sequential color systems may include a set of color filters placed in front of a monochrome display monitor. The system is properly synchronized so that each picture color component is displayed with the color filter set to transmit the desired color. Unfortunately, field sequential color television is basically incompatible with existing color video transmission standards because the three pictures have to be transmitted in the time formerly used by one, with resultant three times increase in signal band width (if the same resolution is to be maintained). If one color frame is transmitted in each time frame, then the three colors are transmitted too slowly for the eye to combine them effectively, resulting in a flickering effect.

Attempts to solve these problems include the use of a multiple beam cathode ray tube to write a television type raster field, or frame, with the maximum data rate and writing speed reduced by a factor equal to the number of simultaneously-operating beams. The multiple beams sweep across the face of the cathode ray tube in paintbrush fashion, drawing two or more lines with each sweep. The frames are generated by vertically deflecting the plurality of beam sweeps down the screen with time so that each successive sweep paints the area directly below the previous sweep.

Conventional vertical deflection techniques utilize a constantly increasing deflection voltage. When applied to multiple beam cathode ray tubes, however, the vertical deflection must proceed at a greater rate to accommodate the added vertical distance which the beams must travel for each successive sweep. This results in a severely sloped picture requiring sophisticated electronics and complex calculations using polar coordinates in order to rotate the picture so that it may be accurately placed on the screen.

SUMMARY OF THE INVENTION

The system in accordance with the invention uses a multiple beam cathode ray tube (CRT) to write a television type raster, or frame, with the maximum data rate and writing speed reduced by a factor equal to the number of simultaneously operating beams. To overcome excessive slope in the picture, a stepped deflection is used so that the majority of vertical deflection occurs after a particular horizontal sweep is completed and before the successive sweep begins.

To further increase processing speed and reduce flicker, a color filter is provided which is capable of selectively transmitting each of the separate colors to be emitted by the screen. A portion of the transmission filter may be selectively set, electronically, to transmit the next color in the color sequence while the remainder of the transmission filter is transmitting the color presently displayed. This eliminates the added time necessary to wait while the filter is switched from one color to the next after the last trace for a particular color.

The received video information may be of any format, but usually it will be color (R, G, B) in standard EIA RS-170 (525 lines-interlaced) or EIA RS-343 (875 lines-interlaced) format. To adapt this standard format to the three-gun display format of the invention a reformatting and memory system is disclosed. The video information for each color—Red (R), Green (G), Blue (B)—is received simultaneously on separate inputs (one for each color) in line serial fashion (i.e., raster-line by raster-line). The present invention separates, reformats, and stores this video information so that it can be read and applied to CRT in multiple line format.

A number of advantages are achieved by the display system of the present invention. First, the stepping of the deflection voltage allows information to be presented on a video display screen in a straightforward manner, obviating the need to make accommodation for a tilt of the raster. Second, the invention provides a flicker-free, high-resolution, high-intensity display of video color information by using multiple beam scans for the raster and a multiple color, electronically switchable filter. Third, transforming the video information from standard RGB format to the multiple-scan, color sequential format used by the invention is accomplished "on the fly" so to speak by the reformatting and storage techniques incorporated in the invention.

These and other advantages and objects of the invention will become apparent to those skilled in this art upon a reading of the following detailed description of the invention, which should be taken in conjunction with the accompanying drawings.

BRIEF DESCRIPTION OF THE DRAWINGS

FIG. 1 is block diagram illustrating the display system constructed in accordance with the principles of this invention;

FIG. 2 is a block diagram of the video reformatter and memory unit used in the display system of FIG. 1 to reformat the incoming RGB video information for presentation by the multiple-gun display unit of the present invention;

FIG. 3 illustrates in greater detail the memory organization of the video reformatter and memory unit of FIG. 2;

FIG. 4A illustrates a portion of a display raster formed by the display system of FIG. 1; and FIG. 4B diagrams voltage waveforms for horizontal and vertical deflection according to this invention, resulting in the raster scan of FIG. 4A.

FIG. 5 is a flowchart illustrating color filter switching according to the invention.

DETAILED DESCRIPTION OF THE PREFERRED EMBODIMENTS

Overview

The general operation of the present invention may be understood by referring to FIG. 1. A display system 4 includes a cathode ray tube (CRT) 6 having multiple electron guns 7 and a phosphor screen 8 capable of being energized to emit light in the form of visual images. A video processor 12 acts as the medium for receiving, reformatting, and temporarily storing a plurality of video input signals 16, and retransmitting the reformatted video signals to the electron guns 7 via signal lines 9. The display system 4 further includes an electronically switchable, optical transmission filter 20 that determines the color of the video perceived by an observer. A filter control 24 controls the transmission filter 20 to select the color of the video communicated to an observer. A sweep control circuit 28, comprising a sweep generator and timing circuit 44 and a deflection amplifier 48, generates the horizontal and vertical deflection voltages for controlling placement of the electron beams produced by the electron guns 7.

Detailed Description

In one form of the invention, the CRT 6, shown here as having three electron guns 7 and a phosphor display screen 8 capable of emitting light in a broad band of the visible spectrum containing at least three distinct colors (e.g., red, green and blue), is arranged to display consecutive lines of one of the three colors of a television video field. A complete display of the input video image is provided when all lines of the video frame have been written to the display screen at the proper line spacing.

Video processor 12, broadly comprising a video reformatter and memory 32 and a video amplifier 36, is arranged to receive the video input signals 16 and temporarily store each separate video color field. The particular reformatted arrangement of video in storage permits the simultaneous communication of consecutive video lines from the same color video field to electron guns 7. Construction of video reformatter and memory 32 will be discussed more fully below in conjunction with discussion of FIGS. 2 and 3.

The electron streams emitted from electron guns 7 pass through a deflection yoke 40 wherein they are vertically and/or horizontally deflected to ultimately impinge upon and energize the display screen 8 at prescribed locations. Deflection yoke 40 receives beam positioning voltages produced by the sweep generator and timing circuit 44 and a deflection amplifier 48 that form the component parts of sweep control circuit 28. Sweep generator and timing circuit 44 is coupled to receive X and Y deflection voltages 17 on signal lines 52 and 56, respectively, to control beam position on the display screen 8 when the display system 4 is operated in a vector generator (i.e., calligraphic) mode. In this case, the sweep generator and timing circuit 44 would include appropriate switching to route the X and Y deflection voltages to signal lines 58 for communication to the deflection amplifier 48. For raster generation, however, X and Y deflection voltages are generated by the sweep generation and timing circuit 44 in response to horizontal and vertical SYNC signals extracted from the video input signals 16 by the video reformatter and memory 32.

The optical filter 20 is an electrically switchable optical transmission filter of known design, using liquid crystal or similar technology. It is constructed to separately pass at least three different colors, which are also capable of being emitted by the display screen 8: red, blue, and green. As FIG. 1 illustrates, the filter 20 is arranged between screen 8 and an observer, and is controlled by filter control 24 to cause the optical filter to transmit (to the observer) the color of the video currently being read from video reformatter and memory 32. The optical filter 20 is constructed so that an upper portion 20A of the filter may be set by filter control 24 to transmit the next color in the color sequence while a lower portion 20B of the transmission filter is transmitting the present color of the sequence.

As will be evident to those skilled in the art, the scanning technique provided herein can be time-consuming. It is for this reason that the multiple guns in CRT 6 are used. Each electron gun 7 handles one of the scan lines of a field, so that three lines are scanned at a time, and a scan field is produced in one-third the time. Additionally, with the optical filter 20 constructed to have an upper portion 20A that is separately controllable from a lower portion 20B, the upper portion 20A can be set to transmit the particular color then being scanned on the display screen 8, while the lower portion 20B can be undergoing a change of state, all in response to control voltages communicated from the filter control 24 via signal lines 25, to switch from a previous color to the upcoming color. And, in similar fashion, when the electron beams reach that portion of the display screen 8 filtered by the lower portion 20B of the optical filter 20, the upper portion 20A can then be commanded to switch.

Each separate color of the video input signals 16 typically will be oriented to be displayed in superimposed fashion on a raster line by raster line basis. In light of the fact that the present invention scans three display lines at a time, some method of reformatting the line sequential video input signals 16 to a format more compatible with a three-line scan is needed. This is the function of the video reformatter and memory illustrated in greater detail in FIGS. 2 and 3.

Referring first to FIG. 2, the video reformatter and memory 32 is shown as including an odd field memory 62 and an even field memory 64, a memory control unit 66, and a field multiplexer (MPX) 68. Typically, the incoming video input signals 16 are analog in nature, as opposed to digital. Although the video reformatter and memory 32 architecture could be digital in nature, using analog-to-digital conversion at the input, and, conversely, digital-to-analog conversion on the output, thereby allowing the internal portions of the video reformatter and memory 32 to be digital, it is left analog in nature. Accordingly, the odd and even field memories 62, 64 are preferably implemented using charge coupled device (CCD) technology to store the information on a pixel by pixel, line by line basis, for each color, and each field.

As the video input signals 16 are received (one for each of the colors red (R), blue (B), and green (G)), they are communicated through buffer amplifiers 60 to both the odd and the even field memories 62, 64. The memory control unit 66 operates to select which of the memories 62, 64 will receive the video information then being received. The unselected memory is simultaneously accessed under control of the memory control unit 66 for returning the color video information that is communicated to the CRT 6.

Thus, while video information is being read into one of the memories 62, 64, the other memory is supplying a field of video to the display 6.

Referring now to FIG. 3, the organization of the odd field memory 62 is illustrated. The operation and the architecture of the even field memory 64 is identical to that of the odd field memory 62. Accordingly, the following discussion of the architecture and organization of odd field memory 62 will apply equally to even field memory 64.

As FIG. 3 shows, the odd field memory 62 includes three separate memories: a red memory 70 for the red color information, a green memory 72 for the green color information, and a blue memory 74 for the blue color information. Each of the red, green, and blue memories 70, 72, and 74, as illustrated by the detail of the red memory 70, comprise again three separate submemories; thus, the red memory 70 is made up of component memories 70a, 70b and 70c. In the case of red memory 70 (which applies equally to the green and blue memories 72, 74) the R video input 16 is received at a multiplexer 76. Selection signals communicated on the odd field control bus 65a are applied to the multiplexer 76, as well as multiplexer 78 and 80 to select which of the memories 70a, 70b, and 70c are to receive a video line of information.

It will be remembered that the incoming video information for each color is in line sequential format. For example, for any particular frame, the first portion of the red video signal will be information for scan line 1, followed by information for scan line 2, and so on. The control signals supplied on the odd field control bus 65 by the memory control unit 66 function to direct the line 1 information for the color red to the red submemory 70a; line 2 is subsequently directed to the red submemory 70b; and line 3 directed to the red submemory 70c. Continuing, line 4 goes to red submemory 70a, line 5 to red submemory 70b, and so on. At the same time the submemories perform store and shift operations to accept the incoming (analog) information under control of signals supplied by the memory control unit 66 on the odd field control bus 65.

When the video information is to be retrieved, addressing and control signals from the memory control unit 66 are applied simultaneously to the red submemories 70a, 70b, and 70c to access and communicate, to the color MPX 82, red color information for three consecutive scan lines. Color MPX 82, under control signals communicated on the control bus 65, selects the information from the red memory 70 for communication, to the field multiplexer 68 (FIG. 2), where, during odd field display, it is further communicated to the video amplifier and on to the CRT 6. Simultaneously therewith, as explained above, information is being read into the even field memory 64.

In this manner, the video information is applied to the display screen 8 of the CRT 6 three scan lines at a time. This multiple scan technique is illustrated in FIG. 4A, which diagrammatically illustrates the first nine scan lines L1-L9 of one color written on the display screen 8. Scan lines L1-L3 are written together, as are scan lines L4-L6 and scan lines L7-L9. When a scan line has completed its travel across the screen, it is returned to a starting point for another scan. Placement of the starting point must leave room for the preceding scan line and the companion line scans. For example, the scan line L1 traverses the display screen 8 from a starting point 80 to a terminal point 82, together with the two companion line scans L2 and L3. The beam that produced the line scan L1 is then returned to a starting point 84 to initiate the scan line L4. In normal raster scan formats, the return point would not be 84; rather, the "flyback" from point 82' would be to point 84'. However, to make room for the scan lines L2 and L3, the deflection voltages must be sufficient to return the beam produced by the gun 7 creating the scan lines L1, L4, L7, etc. to the point 84 (and similar points for remaining scan lines produced by that gun).

In short, using conventional scan techniques with the multiple gun CRT 6, and displaying several consecutive video lines at once, will cause to be formed a raster that is somewhat "tilted." The reason being that if a constant rate vertical drive signal is used, a steeper ramp must be necessary in order to prevent overlapping of successive lines displayed. Accordingly, as illustrated in FIG. 4A, this causes the right side of the displayed video picture to be tilted lower with respect to the left side, distorting the observed video seen.

One correction of this phenomena would be to tilt the display screen 8 by rotating it slightly counterclockwise (as viewed in FIG. 4A). This, however, would require appropriate translation of the video information to compensate for the rotation of the display screen, not a trivial problem.

According to the present invention, therefore, a unique form of vertical drive signal is used, one that is stepped in synchronism with horizontal drive, each step being substantially equal to the amount necessary to position the top line of the succeeding group of video lines exactly one line spacing below the last line of said succeeding group.

This is illustrated in the diagram of FIG. 4B, which shows the horizontal and vertical deflection voltage waveforms (90 and 92, respectively) as a function of time for horizontal and vertical deflection according to this invention. In the example of FIG. 4B, in order to preserve clarity, only four horizontal sweeps are shown as forming a complete field of video. During each horizontal sweep (portion (a) of the horizontal deflection waveform 90), the vertical deflection voltage waveform 92 remains essentially constant. During the horizontal retrace period, the beam is repositioned on the display 8 by the retrace portion (b), and the vertical deflection voltage steps to its next lower value. This step positions the next horizontal trace for each beam to a vertical position one line spacing below the bottom line of the previously displayed group. The step voltage (92c) is of a magnitude sufficient to reposition each of the three beams a distance that leaves room for the preceding three lines, yet allows the scan of the preceding lines to be essentially horizontal. In this way "tilting" of the raster is avoided.

Each separate color video field is read from video reformatter and memory 32 and displayed as multiple consecutive video lines with optical transmission filter 20 switched to pass the appropriate color. Each separate field of color video is displayed in a sequential manner: First, the red (R) field, then the green (G) field, and finally the blue (B) field. After all color video fields contained in the first, e.g., odd field of stored and reformatted video have been displayed, control of the video reformatter and memory 32 is switched to read an alternate, e.g., even, video field from the even field memory 64. The even field video is displayed in the same manner as described with the video being positioned on the screen 8 under control of the deflection signals to interlace with the odd field video which was first displayed. While the second, or even, field of video is being displayed, the memory receives and stores the odd field video from the next input frame to be displayed. By operating this way the invention may use as input standard television format signals, such as are used in broadcast or closed circuit television systems.

While the last sets of lines for a given color are being traced on the lower portion of the screen 8, the upper portion 20A of filter 20 may be switched to transmit the next color in the color sequence. The process is illustrated in FIG. 5. First, it is ascertained in a step 100 whether the lower section of the display screen presently is being scanned. If so, then filter control 24 determines in a step 104 which color is to be displayed next. This may be done easily by storing the values of red, green and blue in a table and accessing the table entries in modulo fashion as is well known in the art. After the next color to be displayed is determined, filter control 24 switches the upper portion 20A of filter 20 to transmit the next color to the viewer in a step 108 and scanning is resumed in a step 112. Thus, after the last set of lines in the current color is traced, the next color may be traced immediately and without waiting the additional time required to switch the filter. The lower portion of the filter 20B may be switched to the new color when the new color trace begins. A faster overall scan rate results and an improved flicker-free picture is obtained.

While the above is a complete description of a preferred embodiment of the present invention, various modifications may be employed. For example, the number of video inputs may be increased or decreased as desired, and video formatter and memory 32 may be constructed using either digital or analog storage devices and techniques. Consequently, the description should not be used to limit the scope of the invention which is properly set out in the appended claims.

What is claimed is:
1. A video display system comprising:
   a cathode-ray tube having a light-emitting screen which is capable of emitting light representing two or more colors of the visible spectrum;
   a plurality of electron guns disposed in the cathode ray tube for emitting a corresponding plurality of electron beams which impinge upon a corresponding plurality of portions of the light-emitting screen so as to cause the plurality of portions to emit light;
   means for horizontally deflecting the plurality of electron beams across the entire width of the light-emitting screen for repetitively tracing a corresponding plurality of generally straight lines across the entire width of the light-emitting screen;
   means for vertically deflecting the plurality of electron beams at approximately the time that the means for horizontally deflecting completes the tracing of the plurality of lines across the entire width of the light-emitting screen so as to substantially eliminate tilting of the plurality of lines on the light-emitting screen;
   input means for receiving a plurality of parallel video signals each representing a different one of two or more colors of the visible spectrum; and
   reformatting means, connected to the input means, for storing the video signals.

2. The video display system according to claim 1 wherein the reformatting means reformats the plurality of video signals such that each of the plurallity of video signals is stored in a respective one of a plurality of sets of memories, with each of the memories storing a portion of the respective video signal corresponding to a different line to be traced on the light-emitting screen by a respective one of the plurality of electron guns.

3. The video display system according to claim 2 further comprising:
   multiplexing means for communicating the portions of the video signal stored in a selected one of the sets of memories to the plurality of electron guns;
   wherein the portion of the video signal stored in each memory of the selected set of memories is communicated to an associated one of the plurality of electron guns, whereby all of the electron guns receive a portion of a video signal representing the same color at any given time.

4. The video display system according to claim 1 wherein the input means receives three parallel video signals representing the colors red, green and blue; and wherein the reformatting means reformats the video signals such that the red video signal is stored in a memory termed a red memory, the green video signal is stored in a memory termed a green memory, and the blue video signal is stored in a memory termed a blue memory.

5. The video display system according to claim 4 wherein each of the red, green and blue memories comprises a plurality of submemories, with each of the submemories storing a portion of the respective video signal corresponding to a different line to be traced on the light-emitting screen by a respective one of the plurality of electron guns.

6. The video display system according to claim 5 further comprising:
   multiplexing means for communicating the portions of the video signal stored in the submemories of a selected one of the red, green and blue memories to the plurality of electron guns;
   wherein the portion of the video signal stored in each submemory of the selected memory is communicated to an associated one of the plurality of electron guns.

7. The video display system according to claim 21 wherein there are two each of the red, green and blue memories, one each of the red, green and blue memories forming a memory termed an odd field memory and storing red, green and blue video signals representing an odd field of an image, and the other red, green and blue memories forming a memory termed an even field memory and storing red, green and blue video signals representing an even field of the image.

8. The video display system according to claim 7 wherein the portions of the video signals stored in the odd field memory are communicated to the plurality of electron guns before the portions of the video signals stored in the even field memory are communicated to the plurality of electron guns.

9. The video display system according to claim 23 wherein the lines traced on the light-emitting screen by the electron guns in response to the portions of the video signals stored in the odd field memory are interleaved with the lines traced on the light-emitting screen by the electron guns in response to the portions of the video signals stored in the even field memory.

10. The video display system according to claim 9 wherein each red, green and blue memory is constructed from charge-coupled devices for storing the video signals in analog format.

11. The video display system according to claim 10 wherein the means for horizontally deflecting simultaneously deflects the plurality of electron beams.

12. The video display system according to claim 11 further comprising:
color filter means disposed between the light-emitting screen and a viewer for selectively transmitting to the viewer light representing each of said two or more colors of the visible spectrum, the color filter means including a first portion disposed between the viewer and a first section of the light-emitting screen and a second portion disposed between the viewer and a second section of the light-emitting screen, the first and second portions of the color filter means being independently controllable; and
control means, connected to the color filter means and to the reformatting means, for causing one of the first and second portions to transmit light representing a selected one of said two or more colors, and for switching the other of the first and second portions to transmit light representing a next selected one of said two or more colors.

13. The video display system according to claim 12 wherein the control means causes said one of the first and second portions to transmit light representing the color of the video signal in response to which lines are currently being traced on the corresponding one of the first and second sections of the light-emitting screen, and wherein the control means switches said other of the first and second portions to transmit light representing the color of the video signal in response to which lines will next be traced on the corresponding one of said first and second sections of said light-emitting screen, said control means switching said other of the first and second portions before the completion of the tracing of lines on the one of said first and second sections corresponding to said one of the first and second portions.

* * * * *